United States Patent Office 2,786,642
Patented Mar. 26, 1957

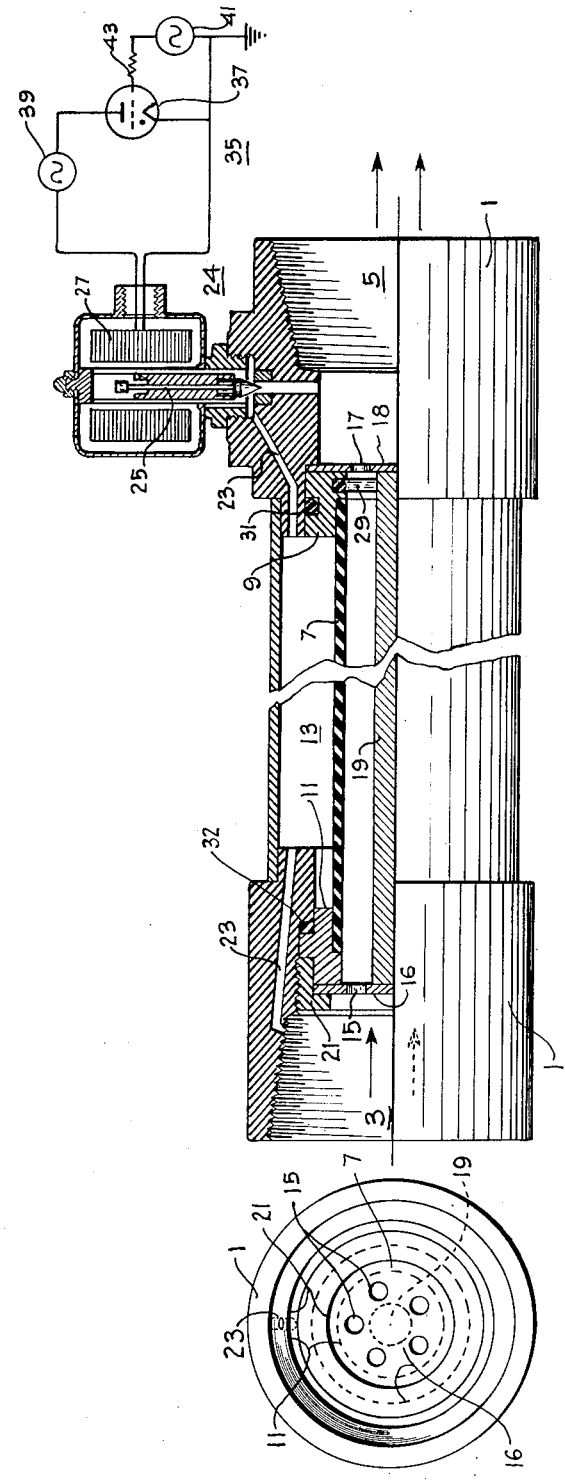

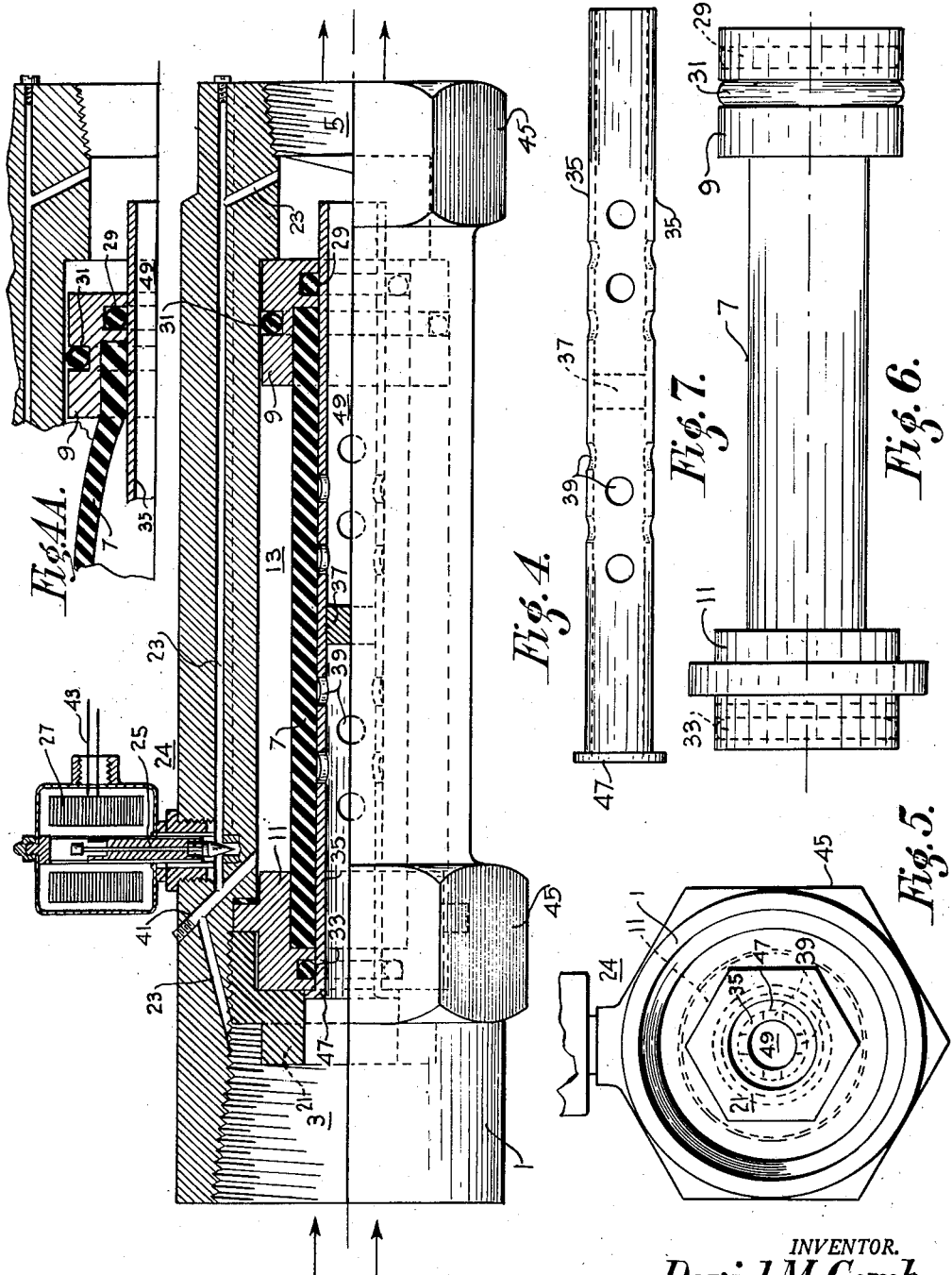

2,786,642

PILOT CONTROLLED RESILIENT TUBULAR VALVE

David M. Comb, Belmont, Calif., assignor of one-half to Lippincott & Smith, San Francisco, Calif., a partnership Application October 30, 1951, Serial No. 253,867

8 Claims. (Cl. 251—30)

This invention relates to improvements in valve assemblies in general, and, more specifically, to a novel valve arrangement wherein fluid flow, through a main conduit may be regulated in accordance with fluid pressure as applied to a pressure-responsive element positioned along the main conduit.

The prior art reveals that valves are usually located along a conduit which communicates with a fluid supply source to intercept directly fluid flow therein. By utilizing pressure differentials as applied to a resilient conduit member, the present invention provides a method of fluid control whereby flow along a main or large conduit may be regulated by a valve located in a small control conduit which may be in fluid communication with the main conduit and a chamber or housing including the resilient member, while permitting substantially linear flow along the main conduit and through the resilient member as contrasted with multi-directional flow through prior art valves. This valve may be manually or automatically positioned, as by an electric solenoid, for example, which, in turn, may be electronically actuated.

Valves in general, and particularly solenoid actuated valves, are subject to failure for many reasons. "Wiredrawing," i. e., enlargement of orifice, is probably the predominant cause of failure among all types of valves. Valve leakage is also occasioned by particles of dirt, lint, etc., sticking to the valve seat to prevent complete closure of the valve. When the valve is located along the main stream, high velocity flow rapidly causes erosion in the vicinity of the foreign particle. The present invention overcomes to a great extent this defect by locating the only movable element in the control conduit to leave the high velocity main conduit free from wire-drawing effects. Also, any foreign particles which might settle adjacent the resilient member are entirely enveloped, and the functioning thereof is free from impairment.

Valves capable of modulating fluid flow, that is, controlling fluid passage in accordance with a variable known or unknown quantity, such as solenoid actuated valves, for example, are subject to seat hammering due to chattering, as well as voltage or current fluctuations. When the valve is located to intercept the main stream, valve plungers and seats are necessarily subject to fine tolerances because of the high pressure stream. By taking recourse to the instant invention, however, the valve is located out of the main stream and hence contacting areas may be constructed of Stellite, suitable jewels or other material which would otherwise not be economically feasible if a valve were employed in the relatively large main conduit.

Other inherent disadvantages of solenoid responsive valves of the prior art are coil failure or burn-out and valve stickage in either an open or closed state. The former may occur if the coil slug or valve stem is not entirely withdrawn from the solenoid or pulled completely into the solenoid. Over design of the coil of such prior art arrangements involves added expense which is necessary to insure the system against coil burn-out.

Obviously, coil failure associated with a valve in the main conduit as in the prior art is much more serious as regards flooding and repair than coil failure as applied to the smaller control conduit of the present invention. Further, a solenoid suitable for use with a valve in the control stream is proportionately less expensive than a solenoid which would be required for a valve in the main stream. Valve stickage may be occasioned by partial or total power failure or by adherence between the valve contacting areas. Disadvantages of valve stickage are similar to those above set forth regarding coil failure. Thus the present invention lessens the gravity of such situations by locating the valve contact areas out of the main stream.

This invention is particularly suitable for use in refrigeration systems and in such applications many undesirable features of valves heretofore employed are eliminated. The refrigerant, in undergoing the liquid-to-gaseous transition, drops very substantially in temperature, thus concentrating the freezing of extraneous moisture present in the vicinity of the expansion valve. This moisture condensation and freezing is a predominant cause of failure of valves in refrigeration systems. Likewise, in present day aircraft, high altitude flying admits of low ambient temperatures, and hence valve freezing results. By employing the resilient conduit member as mentioned, the valve herein described serves to overcome such undesirable occurrences.

Accordingly, it is an object of the present invention to provide a valve control assembly wherein no close fitting seats or contacting areas are located in the main stream.

A further object of the present invention is the provision of a valve control assembly wherein no packing glands are positioned along the main stream.

Another object of the present invention is to provide a valve control assembly capable of fluid control without necessitating moving mechanical parts for intercepting the main stream.

Further, it is an object of the present invention to provide a control conduit capable of the regulation of fluid flow along a main conduit, which control conduit is neither limited in size, nor in any way dependent upon the size of the main conduit.

A further object of the present invention is the provision of a valve regulating assembly which may be automatically or manually actuated.

Another and further object of the present invention is the provision of a valve control assembly wherein fluid flow along a main conduit may be modulated by the actuation of a valve located in an associated but much smaller conduit.

A further object of the present invention is the provision of a pressure responsive valve control assembly.

Still a further object of the present invention is the provision of a valve assembly through which flow may be electronically controlled or modulated.

Another object of this invention is the provision of a valve control assembly which may be economically manufactured and installed.

Still another object of the present invention is the provision of a valve control assembly which inherently overcomes many of the defects presently encountered in prior art valve assemblies.

It is a further object of the present invention to minimize angular valve paths for the main stream.

Other and further objects of the present invention will be apparent to those skilled in the art from a reading of the following detailed description thereof taken in conjunction with the accompanying drawings wherein:

Fig. 1 is a view in side elevation, partly in broken section, to show structure representative of the present invention;

Fig. 2 is an end view of the structure of Fig. 1;

Fig. 3 is a side elevational view, partly in broken away section, to show the resilient member of Fig. 1 and its internal structure;

Fig. 4 is a view, partly in side elevation and partly in longitudinal cross-section, of a modified form of the present invention;

Fig. 4A is a sectional view of a portion of the side elevation in longitudinal cross-section of the valve of Fig. 4 with the resilient sleeve flexed and the sealing closure displaced from its Fig. 4 showing;

Fig. 5 is an end view of the structure of Fig. 4, looking in the direction of fluid flow;

Fig. 6 shows a resilient member suitable for use with the structure of Fig. 5;

Fig. 7 is a view in side elevation of a rigid member to be contained within the resilient member of Fig. 6;

Referring now to the drawings wherein like numerals designate corresponding parts throughout the several views:

Figure 10:
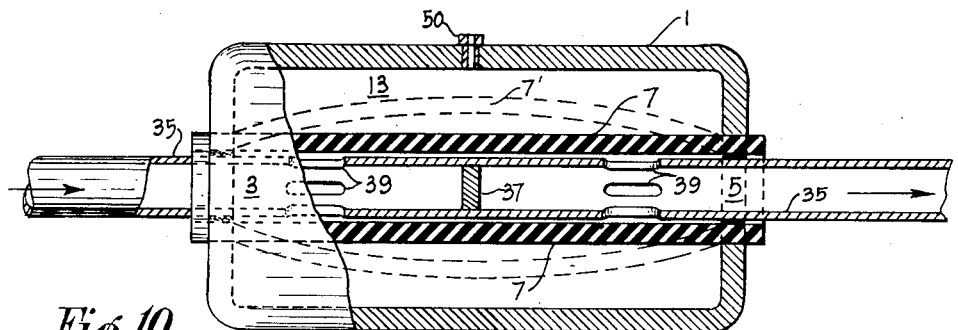
Fig. 10 is a schematic representation (also partly in section) similar to that of Fig. 8, but showing a further modification of this invention.

In Fig. 1, a fluid-impermeable container or pipe section 1 is shown partly broken away to reveal the structure contained therein, which is suitable for carrying out the principles embodied in the present invention. The pipe section 1 is adapted for connection at each of the ends thereof to a fluid main. In order that fluid ingress may be had at one end, and so that fluid flow will follow the direction of the arrows to provide fluid egress at the other end, respective ingress and egress ports 3 and 5 are provided at these ends of attachment. A hollow resilient member 7 (tubular in the showing of Fig. 1) is located within pipe 1 and attached thereto by means of sealing rings 9 and 11, to leave a fluid-tight chamber 13 between the resilient member 7 and pipe 1. Fluid ingress to and egress from the hollow resilient member 7 is provided by the openings 15 and 17, which are placed in plates 16 and 18 which are integral with the rings 11 and 9 respectively. Axially located within member 7 is a rod 19 which is supported by the sealing ring plates 16 and 18. A securing ring 21 fastens the member 7 and the rod 19 into position in the pipe section 1.

A contributing fluid conduit 23 communicates with the fluid ingress end of pipe 1 and with chamber 13. The egress portion of the conduit 23 includes a valve 24 which has a plunger 25 actuable by a solenoid 27. When the valve is open, fluid may flow to the egress port of the pipe. The sealing ring 9 includes two rings 29 and 31 which have become known in the art as "O-rings." These are fitted therein to provide a fluid tight seal at one end of chamber 13 with ring compression.

The internal surface area of member 7 is less than the external surface thereof, with the difference being proportional to the difference between the internal and external diameters. Thus, fluid flow through the openings 15 causes expansion of member 7 outwardly into chamber 13 when valve 24 is open, and consequently fluid flow is in the direction of the arrow through the fluid ingress ports 15, through member 7, and out fluid egress port 17. When the valve 24 is closed, the external pressure on the member 7 becomes greater than that internally thereof, since conduit 23 communicates with chamber 13 and the fluid ingress end of pipe 1. This pressure difference which is a function of surface area difference between the outer and inner surfaces of member 7 is applied to the relatively large external surface area of resilient member 7 to bias this member inwardly and thus cause it to be compressed around rod 19. This closure or compression prevents fluid flow through the member 7.

The resilient member 7 is preferably constructed of rubber or a synthetic rubber, such as those types which are known by the trade names "neoprene" or "Thylite." The latter two are desirable when chemicals or gases are employed with the present system and the former is suitable for use in common ordinary water mains. Geon, Buna-S and Silicone rubbers also provide suitable resiliency over extended high and low temperature ranges, i. e., from $+675°$ F. to below $-65°$ F., which ranges are being extended daily.

An electronic circuit, generally designated at 35, is shown connected to actuate the solenoid 27. This circuit includes a switching means 37, herein illustratively represented as a thermionic or gaseous discharge tube, such as a tube of the so-called 884-type, for example, where the gaseous discharge is used, connected to apply alternating potential from source 39 to solenoid 27 in accordance with an input signal supplied from any suitable control source, herein designated for illustration as 41. An impedance 43 is connected between the control source and the grid of tube 37, to prevent excessive current from damaging the grid. With a circuit arrangement of this character, fluid flow through member 7 may be regulated in accordance with a known or unknown signal. Thus, the magnitude of fluid flow along the fluid main may be regulated in accordance with any signal as applied at 41.

By locating valve 24 along the passage 23, and hence employing low mass contact areas, solenoid 27 will supply adequate ambient heat to prevent icing of this valve when applied to either refrigeration systems or high altitude aircraft.

As should now be apparent the relative sizes of control conduit 23 and resilient conduit 7 are subject to unlimited variations with specific applications determining the designs thereof. For example, some properties of check valves are obtainable if the discharge end of control conduit 23 is sized larger than the inlet section thereof such that backward flow is restrained. However, the control conduit 23 per se is subject to one restriction, that is, the ingress portion thereof leading to chamber 13 must offer greater resistance to fluid flow than the egress section which leads to exhaust port 5. Thus the pressure in conduit 23 is relieved faster than it is built up and accordingly resilient member 7 may be expanded upon opening of valve 24.

Fig. 2 represents an end view of the structure of Fig. 1. The pipe 1 is shown adjacent to the end of the retaining ring 21. The circular plate 16, attached to sealing ring 11, includes the openings 15 and an end of rod 19.

More detailed representation of the resilient member 7 with sealing rings 11 and 9 bonded thereto and with rod 19 being visible through the break in member 7 is shown in the side elevation of Fig. 3. The external "O-ring" 31, included in sealing ring 9, is visible in this view. Preferably, sealing rings 9 and 11 are constructed of steel and then bonded to the resilient member. In assembly, member 7 is placed through the opening 3 of pipe 1 to fit adjacent the internal shoulder of pipe 1 near the fluid egress port 5. Retaining ring 21 is then tightened into position firmly to secure resilient member 7 and rod 19 in place. If desired a gasket 32 may be provided on sealing ring 11 to effect an even better fluid seal between pipe 1 and ring 11.

A modified structure also suitable for carrying out the principles embodied in the present invention is shown by the side elevation of Fig. 4. This view, as in Fig. 1, is partly broken away to show the internal structure included within the fluid container or pipe 1. Also, as in Fig. 1, pipe 1 is adapted to connect with a fluid main having its fluid ingress port at 3 and its fluid egress port at 5. In this figure a rigid hollow member 35 replaces the rod member 19 of Fig. 1. The member 35 is closed at an intermediate position 37 and has openings 39 disposed along its surface to communicate with the hollow interior thereof. The resilient member 7 is adapted to fit rather snugly over member 35 to thus close the openings 39. Sealing rings 9 and 11, similar to those shown in Fig. 1, are employed to secure member 7 against the ends of support member 35, and to provide a fluid-tight seal for chamber 13. Appropriate "O-rings" 29, 31, and 33 are employed to effect this sealing, and retaining ring 21 again secures the members 35 and 7 within pipe 1.

The contributing fluid conduit passage 23 communicates at its fluid ingress port with the opening 3 of pipe 1 and at its fluid egress port with the opening 5 of pipe 1. A connecting passage 41 provides for fluid communication between chamber 13 and fluid conduit passage 23. The passages 23 and 41 are preferably bored in the surface of pipe 1 and are consequently linear in nature. Also along passage 23 there is located means for connecting thereto a valve 24 to open or close passage 23 to fluid flow. Here, also as in Fig. 1, a plunger 25 is adapted to be actuated by a solenoid coil 27 to open or close the passage 23. As has been hereinbefore mentioned, the valve seat for plunger 25 is much less extensive in contact area than a valve seat which might be positioned transversely of member 35, i. e., to intercept the main stream, hence economy permits the use of a so-called Stellite or jeweled seat for plunger 25. Connections 43 (similar to those indicated in Fig. 1) are provided for actuating solenoid 27, although it is clear that modified electrical or even manual valve controls may be used and the specific construction of the plunger control 25 constitutes a part of this invention only in combination with other elements. The solenoid 27 may be controlled by an electronic circuit of the type shown in connection with Fig. 1, or by any electrical signal derived from any source (provided sufficient amplification is employed as needed) such as a temperature-responsive bi-metallic strip, which illustratively, may be positioned along the main flow conduit to yield an electrical signal proportional to the heat of the fluid flowing therethrough. Obviously, valve 24 may be hand-actuated by merely providing a thumbscrew or winged nut and appropriate threadings for plunger 25, and hence discarding the windings of solenoid 27.

The underlying principle of operation of the structure of Fig. 4 is substantially the same as the principle of operation explained in connection with Fig. 1. With valve 24 open, fluid flow entering ingress port 3 will proceed along the hollow interior of member 35 through the openings 39 located on the left-hand side of the closed intermediate position 37 to bias resilient member 7 outwardly and thus allow the flow to continue along the external surface of member 35 and back into the internal surface of this member, through the openings 39 located to the right of the intermediate position 37 and hence through fluid egress port 5 to the fluid main. Obviously, fluid flow is also maintained through conduit 23 simultaneously with the flow through conduit 35. However, when valve 24 is in a position to close passage 23, fluid pressure through member 35 attempts to bias resilient member 7 outwardly in order that fluid communication might be established between the openings 39 disposed on both sides of the intermediate closed position 37. Since the external surface area of member 7 is greater than the internal surface area of this member, fluid pressure along passage 23 via connecting passage 41 and throughout chamber 13 is greater along the external surface area of member 7 than the fluid pressure through conduit 35 against the internal surface area of this member, and hence the resilient member is held tightly against the supporting member 35 to maintain the openings 39 closed. Thus, no fluid flow occurs along the member 35 when valve 24 is in the closed position. It should now be apparent that by modulating the flow along passage 23, the magnitude of fluid flow along member 35 may be controlled.

The presence of foreign particles adjacent to the external surface of member 35 has substantially no effect on the operation of the resilient member, as it merely envelops such particles in contracting (being compressed) about support member 35 to close the openings 39. If the structure of Fig. 4 is applied to refrigeration systems, it is readily apparent that liquid to gaseous pressure changes would occur along that portion of the length of member 35 which contains the openings 39, hence concentrated pressure changes are avoided. Any ice which might form as a result of decreased ambient temperature due to such expansion would be enveloped by resilient member 7 without resulting failure in valve action. Further, actuation of member 7 serves to shatter forming ice encrustations and thereby eliminate serious icing problems.

The structure shown in Figs. 4 and 4a admits of increased pressure sensitivity in the valve described, because the "O-rings" 29 and 31 serve as a floating mount for the sealing ring 9. As is shown in Fig. 4a, this sealing ring may move in a longitudinal direction when pressure is applied to the internal surface of member 7 to bias it outwardly and hence less pressure is required to uncover the openings 39 than would be required if the ring 9 were rigidly affixed to members 1 and 35.

Fig. 5 is an end view of the structure of Fig. 4. The hexagonal surfaces 45 integral with pipe 1 are provided in order that wrenches may be applied thereto when pipe 1 is to be coupled to a fluid main. The inner hexagonal portion of retaining ring 21 is also adapted to receive a wrench for positioning ring 21 within pipe 1. The opening 49 in member 35 may define one end of the main fluid conduit which is provided in member 35.

In Figs. 6 and 7 there is shown detailed construction viewed in side elevation of the members 7 and 35. Member 7, as in Fig. 1, may be constructed of rubber or synthetic rubber, such as neoprene or Thylite, the latter again being desirable when gases which are chemically active are employed in the present invention. The resilient member 7 has at either end sealing rings 11 and 9, bonded thereto with "O-ring" 31 being visible on the sealing ring 9. The rigid support member 35 which is contained within resilient member 7 and supports the same, has the openings 39 distributed about its periphery on either side of the closed intermediate position 37. The flange 47 on the left-hand end of member 35 serves to maintain sealing ring 11 and resilient member 7 in place on this member.

Again, assembly of the structure of Fig. 4 is similar to the assembly process as described in connection with the structure of Fig. 1, in that supporting member 35 is placed within resilient member 7, and the combination is then inserted in pipe 1 where retaining ring 21 is tightly screwed against sealing ring 11, to maintain the combination in position and to allow the "O-rings" to effect fluid-tight seals.

Figure 9:
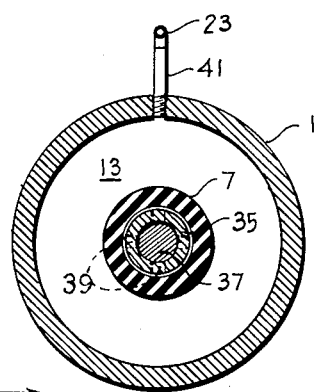
Fig. 9 is a cross-sectional view of Fig. 8, taken on the plane 9—9 looking in the direction of the arrows.
Figure 8:
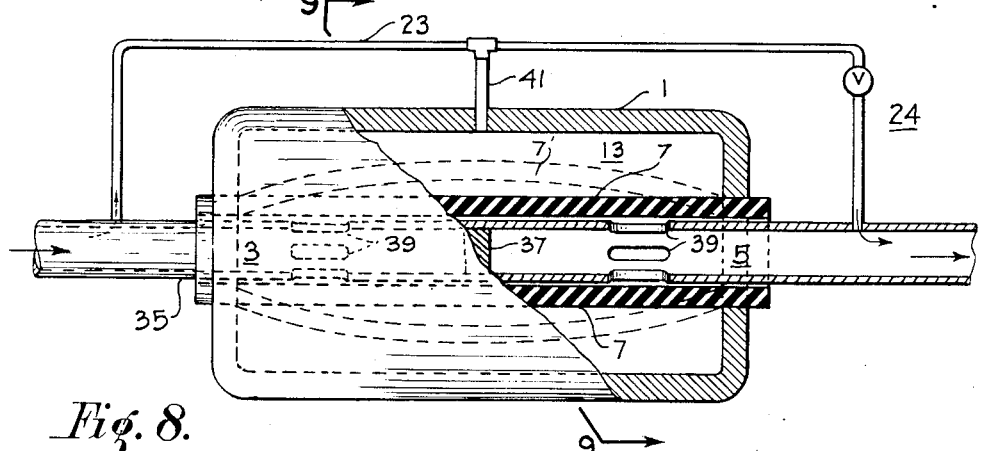
Fig. 8 is a schematic representation (also partly in section) of a further modification of the present invention.

Figs. 8 and 9 represent a schematic showing of apparatus suitable for carrying out the principles of the present invention with Fig. 9 being a cross sectional view of the structure of Fig. 8 taken along the plane 9—9. In these views, a container or pipe section 1 is shown enveloping the resilient member 7, which is supported by the rigid member 35. The barrier or intermediate closed position 37 of the member 35 is located between the dispersed openings 39 which permit pressure in member 35 to bias member 7 to its expanded position 7' in chamber 13. Fluid flow is in the direction of the arrow with the fluid ingress port 3 being shown at the left-hand side of the drawing and the fluid egress port 5 at the right-hand side of the drawing. In this drawing, a capillary tube 23 replaces the contributing passage or conduit shown in the other figures. With this construction, the capillary tube may be extended a distance away from the main to leave valve 24 accessible when the main (not shown) which communicates with supporting member 35 is relatively inaccessible. For example, as applied to aircraft engines, such structure is particularly desirable. The connection 41 is provided to allow fluid communication from capillary tube 23 to the chamber 13, in order that pressure differentials may be applied to the resilient member to bias it into the closed position shown at 7. The underlying principle of operation is again the same with the external surface area of member 7 being greater than the internal surface area thereof, so that when valve 24 is closed pressure along passages 23 and 41 may bias member 7 to cover the openings 39, and when valve 24 is open pressure along the internal area of member 7 via openings 39 in conduit 35 may bias this member to the position designated as 7', in order that fluid flow may be maintained along member 35. Here again the valve 24 may be manually operated or electronically operated as was represented in connection with Fig. 1. Since the capillary tube is very substantially smaller in cross-sectional area than the conduit member 35, economy again permits the use of extremely hard materials for valve seats, which otherwise would have been to expensive.

In Fig. 10, a modification of the embodiment represented in Fig. 8 is also shown schematically. The direction of flow through conduit member 35 is as indicated by the arrows with the openings 39 suitably located on either side of the barrier 37 to permit pressure in member 35 to bias resilient member 7 outwardly into chamber 13, with container 1 forming an enclosure surrounding members 7 and 35. A nipple 50 is provided to allow fluid communication from any source whatsoever with chamber 13. In this manner, gaseous pressure may regulate liquid flow, or liquid pressure may regulate gaseous flow, i. e., fluid pressure may regulate fluid flow. Preferably, this embodiment is designed to allow great flexibility in controlling the fluid flow along conduit 35. It should be apparent from an understanding of the structures represented in the other figures in the drawings that pressure applied through nipple 50 to the external surface area of resilient member 7 will close or open the openings 39 to fluid flow along conduit 35, depending upon the pressure applied against the internal surface area of member 7. Here again modulation of the flow along conduit 35 may be accomplished by varying the pressure introduced at the nipple 50.

What is claimed is:

1. Apparatus for controlling fluid flow comprising a hollow fluid conduit member having fluid ingress and egress openings therein, closure means fixed within said member to prevent fluid flow therethrough, said member having peripheral openings communicating with the interior thereof disposed about said closure means, a hollow resilient member normally snugly fitting over at least that portion of the periphery of said conduit member including said peripheral openings, a fluid impermeable container encompassing said members to leave access to said ingress and egress openings, a contributing fluid conduit to provide fluid communication from said ingress opening and said egress opening to the interior of said container, and a valve in said contributing conduit whereby regulation of said valve allows a pressure differential to be applied to said resilient member to control fluid communication between said openings in said fluid conduit member and sealing means securing said hollow resilient member substantially at one end to said conduit member, the other end thereof being free to move longitudinally along said conduit member in response to fluid pressure effective on said resilient member, thereby increasing the pressure-responsive sensitivity of said resilient member.

2. Apparatus for controlling fluid flow comprising in combination, a hollow fluid main section, an elongated conduit member disposed within the main section, closure means fixed within the conduit to preclude fluid passage therethrough, the surface of an elongated hollow resilient member encasing and normally tightly fitting the conduit member, said conduit member having at least a pair of peripheral openings separated by the closure means and covered by the resilient member, means mutually securing one end of each of the conduit member, resilient member and main section, means disposed between the main section and the conduit member and secured to the opposite end of the resilient member to permit longitudinal movement of the latter along the conduit member in response to pressure differentials established internally and externally of the resilient member whereby fluid flow is established and relieved under the control of the resilient member.

3. Apparatus for controlling fluid flow comprising in combination, a hollow fluid main section, an elongated conduit member disposed within the main section, closure means secured within the conduit member to preclude fluid passage therethrough, an elongated hollow resilient member encasing and normally tightly fitting the conduit member, said conduit member having at least a pair of peripheral openings separated by the closure means and covered by the resilient member, means mutually securing one end of each of the conduit member, resilient member and main section, means disposed between the main section and the conduit member and secured to another end of the resilient member to permit longitudinal movement of the latter along the conduit member, and means to establish a pressure differential externally and internally of the resilient member to flex it radially outwardly of the conduit member and thereby uncover said openings so that fluid flow is determined by differential pressure introduced flexure of the resilient means.

4. Apparatus for controlling fluid flow comprising in combination, a hollow fluid main section adapted to receive fluid through one end thereof, an elongated conduit member longitudinally disposed within the main section, closure means fixed within the conduit member to preclude fluid passage therethrough, an elongated hollow resilient member substantially encasing the conduit member, said conduit member having at least a pair of openings separated by the closure means and normally covered by the resilient member, means mutually securing one end of each of the conduit member and resilient member to said one end of the main section to permit fluid to enter said conduit member, bearing means disposed between the main section and the conduit member and secured to an opposite end of the resilient member to permit longitudinal movement of the resilient member and bearing means along the conduit member, and means to establish a radial pressure differential effective on the resilient member so that fluid flow is determined by the resilient member through differential pressure introduced movement thereof.

5. Apparatus for controlling fluid flow comprising in combination, a hollow fluid main section adapted to receive fluid through one end thereof, an elongated conduit member longitudinally disposed within the main section, closure means fixed within the conduit member to preclude fluid passage therethrough, an elongated hollow resilient member substantially encasing the conduit member, said conduit member having openings at each side of the closure means and normally covered by the resilient member, means mutually securing one end of each of the conduit member and resilient member to said one end of the main section to permit fluid to enter said conduit member, an annular bearing closure disposed between the main section and the conduit member and secured to the opposite end of the resilient member, a pair of O-rings respectively positioned in the internal and external peripheries of the bearing closure to permit longitudinal movement of said opposite end of the resilient member and bearing closure along the conduit member, and means to establish a radial pressure differential effective on the renilient member so that fluid flow is determined by the resilient member through differential pressure introduced movement thereof.

6. Apparatus for controlling fluid flow comprising a fluid impermeable pipe section, an elongated conduit member having peripheral openings therethrough within a central portion of the length thereof, means for positioning the conduit within the pipe section to receive fluid through an end thereof, means secured within the conduit member at a plane within the longitudinal length of the conduit wherein openings are present to preclude fluid passage directly through the conduit, a resilient member adapted to fit snugly on the outer periphery of said conduit member to cover said openings, a fixed sealing closure between an end of the resilient member adjacent to said end of the conduit member and the pipe section, annular bearing means fixed to the other end of the resilient member, said annular bearing means having internal and external peripheral recesses, a plurality of O-rings respectively positioned in said recesses and abutting the pipe section interior and the conduit member exterior to provide a fluid tight chamber in cooperation with the sealing closure between the resilient member and pipe section, and means for introducing fluid to said chamber to establish fluid pressure effective along the external periphery of the resilient member whereby outwardly effective radial pressure differentials on the resilient member move it outwardly of the conduit member and said other end thereof longitudinally along the conduit member to establish fluid flow.

7. Apparatus for controlling fluid flow comprising a fluid impermeable pipe section adapted for fluid passage therethrough, an elongated conduit member having a plurality of peripheral openings therethrough positioned within the pipe section and adapted to receive fluid through an end thereof, means closing the conduit member intermediate the plurality of openings, a resilient member adapted to fit snugly on said conduit member to cover said openings, a fixed sealing closure between an end of the resilient member adjacent to said end of the conduit member and the pipe section, annular bearing means fixed to the other end of the resilient member, said annular bearing means having internal and external peripheral recesses, a plurality of O-rings respectively located in said recesses to abut the pipe section interior and the conduit member exterior to provide a fluid tight chamber in cooperation with the sealing closure between the resilient member and pipe section, and means for introducing fluid to said chamber to establish fluid pressure effective along the external periphery of the resilient member whereby outwardly effective radial pressure differentials on the resilient member move it outwardly of the conduit member and said other end thereof longitudinally of the conduit member thereby uncovering said openings and establishing fluid flow through said pipe section.

8. Apparatus for controlling fluid flow comprising a fluid impermeable pipe section, an elongated conduit having peripheral openings within a central section of the length thereof, means for positioning the conduit within the pipe section so that the openings are contained within the pipe section and fluid is adapted to be supplied at one end of the conduit, a barrier element secured within the conduit in a region such that peripheral openings are at either side thereof and so that direct fluid passage through the conduit is precluded, a resilient member adapted to fit snugly about the outer periphery of the conduit and to extend longitudinally of the conduit to cover said openings, a fixed sealing closure between one end of the resilient member adjacent to one end of the conduit and the pipe section to seal the said end, an annular bearing means secured to the other end of the resilient member and having internal and external bearing surfaces adapted respectively to provide fluid tight closure between the conduit and the resilient member and between the pipe and the resilient member, means for introducing fluid into the chamber formed between the pipe section and the resilient member to establish fluid pressure effective along the external periphery of the resilient member so that outwardly effective radial pressure differentials on the resilient member provided by pressure differences between the chamber and the conduit tend to flex the resilient member and move it away from the conduit to move the free end longitudinally of the conduit with internal pressures in excess of the chamber pressure and to force the resilient member tightly about the conduit when chamber pressures exceed conduit pressures.

References Cited in the file of this patent

UNITED STATES PATENTS

| | | |
|---|---|---|
| 2,247,363 | Dunn | July 1, 1941 |
| 2,317,376 | Grove | Apr. 27, 1943 |
| 2,331,291 | Annin | Oct. 12, 1943 |
| 2,470,744 | Korn | May 17, 1949 |
| 2,501,751 | Aldridge | Mar. 28, 1950 |
| 2,583,231 | Ragland | Jan. 22, 1952 |
| 2,590,215 | Sausa | Mar. 25, 1952 |
| 2,609,001 | Hebard | Sept. 2, 1952 |

FOREIGN PATENTS

| | | |
|---|---|---|
| 132,806 | Australia | May 25, 1949 |
| 449,507 | Italy | June 22, 1949 |
| 986,047 | France | Mar. 21, 1951 |